June 11, 1940.  D. S. MUZZEY, JR  2,204,436
COMMUTATION SYSTEM
Filed Feb. 5, 1938  4 Sheets-Sheet 1

Inventor: David S. Muzzey Jr.
By his Attorney:

June 11, 1940.  D. S. MUZZEY, JR  2,204,436
COMMUTATION SYSTEM
Filed Feb. 5, 1938  4 Sheets-Sheet 3
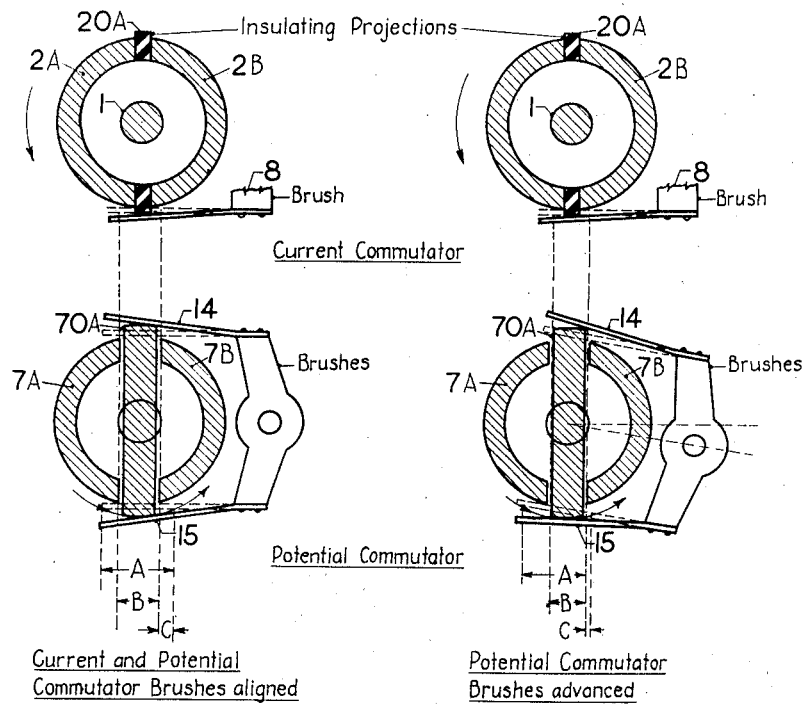
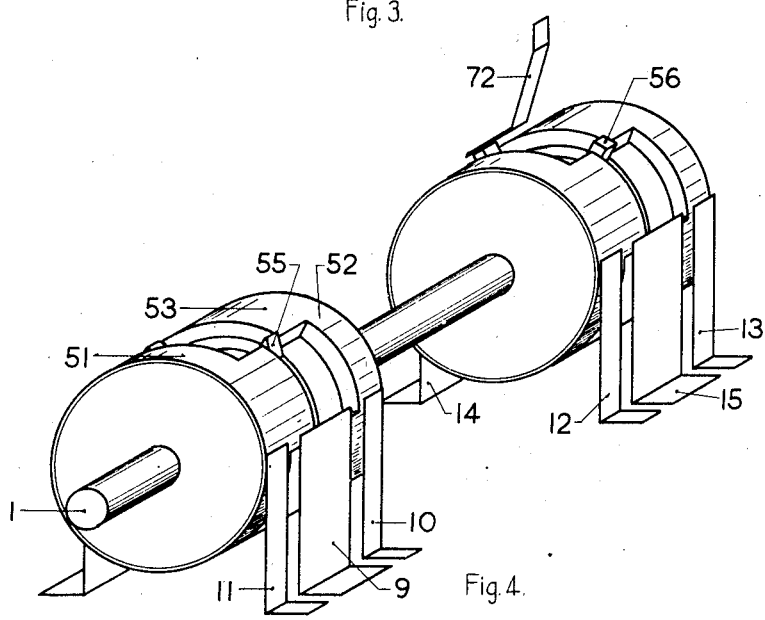

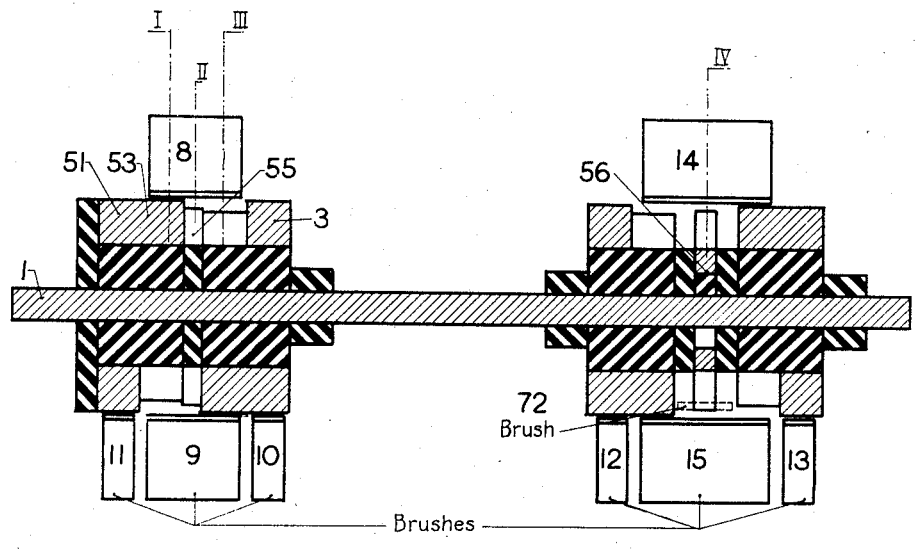
Current Commutator    Potential Commutator
Fig. 5.
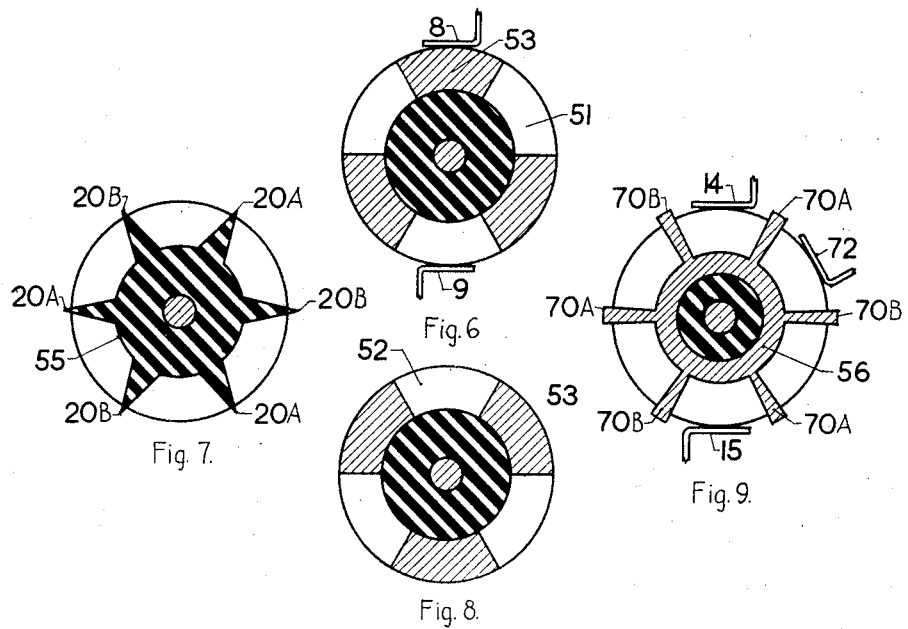
Fig. 6.
Fig. 7.    Fig. 8.    Fig. 9.
Inventor: David S. Muzzey Jr.
By his Attorney:

Patented June 11, 1940

REISSUED

SEP 30 1941

2,204,436

UNITED STATES PATENT OFFICE 2,204,436

COMMUTATION SYSTEM

David Saville Muzzey, Jr., Houston, Tex., assignor to Shell Development Company, San Francisco, Calif., a corporation of Delaware Application February 5, 1938, Serial No. 188,954

12 Claims. (Cl. 175—182)

The present invention pertains to a low-frequency system of synchronous commutation.

Although this invention may be used in electrical circuits of any type, it has a particularly useful application in methods of geophysical exploration of underground formations, wherein a commutated electric current is passed through the earth strata between grounded current electrodes, while the potential difference generated in the earth by said current, or due to other causes, is measured between grounded potential electrodes by means of suitable indicating devices.

In exploring the ground by means of commutated direct current it is customary to use so-called synchronous commutators, adapted to reverse in synchronism, and at a desired frequency, the connections between the source of current and the current electrodes, and the connections between the indicating devices and the potential electrodes.

Although the methods for commutating direct current commonly used in geophysical exploration give satisfactory results when relatively high frequencies, such, for example, as 40 cycles per second, are used, and when the electrodes are placed relatively close to each other, these methods give rise to various undesirable electrical phenomena in cases when very low frequencies, such, for example, as one cycle per second, are used, or when the electrodes are spread over a relatively large distance, such for example, as a mile.

It is therefore the object of this invention to provide a system of synchronous commutation effective for any desired frequency and any desired electrode spread.

This and other objects of this system as well as the arrangement of apparatus used in practicing the present invention, will be understood from the following description, taken with reference to the attached drawings, wherein:

Fig. 3 is a schematic diagram illustrating the control of the time lag between the closing of the current and of the potential circuits of the present commutator.

Fig. 4 is a perspective view of the present commutator.

Fig. 5 is a cross-section view of the present commutator.

Fig. 6 is a cross-section view taken along line I—I of Fig. 5.

Fig. 7 is a cross-section view taken along line II—II of Fig. 5.

Fig. 8 is a cross-section view taken along line III—III of Fig. 5.

Fig. 9 is a cross-section view taken along line IV—IV of Fig. 5.

Figure 1:
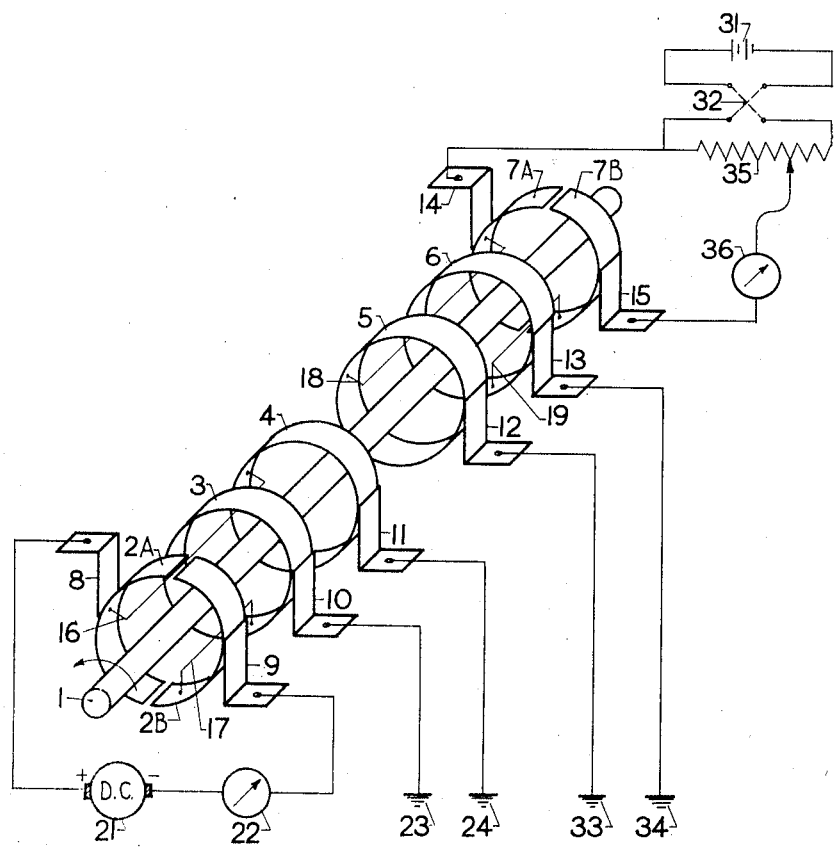
Fig. 1 is a schematic diagram of a conventional synchronous commutator.

The nature of the present invention can be more readily understood by referring first to a conventional type of synchronous commutator schematically shown in the diagram of Fig. 1.

A rotatable shaft 1 has rigidly mounted thereon an insulated commutator ring 2AB having segments 2A and 2B insulated from each other, and a second commutator ring 7AB having insulated segments 7A and 7B. The gaps between the segments of both commutators are accurately aligned with each other. Rigidly mounted on the same shaft are also slip rings 3, 4, 5, and 6. The commutator segment 2A is electrically connected to slip ring 4 by means of a conductor 16, while the segment 2B is connected to slip ring 3 by means of conductor 17. In the same manner, the commutator segments 7A and 7B are connected to slip rings 5 and 6 by means of conductors 18 and 19, respectively.

The commutator ring 2AB is in contact with brushes 8 and 9, which are in circuit with a source of direct current 21 and an indicating device such as an ammeter 22. Slip rings 3 and 4 are in contact with brushes 10 and 11 which are connected to the current electrodes 23 and 24, respectively.

The commutator ring 7AB is in contact with brushes 14 and 15, which are connected with a potentiometer circuit comprising a source of E. M. F. 31, a reversing switch 32, a potential divider 35 and an indicating device such as a galvanometer 36. Slip rings 5 and 6 are in contact with brushes 12 and 13 connected to the potential electrodes 33 and 34, respectively.

It is understood that in actual practice the electrodes are usually arranged in such manner, that the spread of the potential electrodes 33 and 34 overlaps that of the current electrodes 23 and 24, or includes the latter, or is included thereby.

With the arrangement of apparatus shown in Fig. 1, it will be seen that a rotation of the shaft 1 will cause a positive and a negative potential to be alternately applied to electrode 24 through brush 11, slip ring 4, conductor 16 and segment 2A, as brushes 8 and 9 alternately come in contact with said segment 2A, while a corresponding reverse sequence of changes of potential is impressed on the electrode 23 through brush 10, slip ring 3, conductor 17 and segment 2B.

A commutated current of a frequency determined by the speed of rotation of shaft 1 will therefore flow in the ground betwen the electrodes 23 and 24. The potential difference generated in the ground between the electrodes 33 and 34 by the commutated current flowing between the electrodes 23 and 24 will alternate in synchronism with the rotation of commutator 2AB. Since, however, the electrodes 33 and 34 are connected through brush 12, slip ring 5, conductor 18 and segment 7A, and through brush 13, slip ring 6, conductor 19 and segment 7B, respectively, to brushes 14 and 15, and since commutator ring 7AB rotates in synchronism and has gaps in alignment with those of commutator ring 2AB, an unidirectional potential difference will be obtained between brushes 14 and 15. This potential difference may be conveniently measured by means of galvanometer 36, for example, by reducing the reading of said galvanometer to zero by means of a suitable adjustment of the potential divider 35.

The commutating device described above is, however, subject to the following drawbacks when applied to methods of geophysical exploration.

(1) If it is desired that the current penetrate the ground to a considerable depth, the spacing between the electrodes must be made large, and very sensitive measuring devices, or currents of greater intensity, or both, must be used to make measurements sufficiently accurate to detect deep anomalies. As the electrode spacing and the current intensity are increased, the direct electromagnetic coupling between the current and the potential circuits is increased due to the increase in the size of the loops formed by the cables to the electrodes and the path through the ground. At some spacing whose magnitude depends on the arrangement of electrodes and cables and on the sensitivity of the apparatus, the transient electrical phenomena caused at each commutation by this direct coupling become sufficiently great to cause appreciable errors in the readings of the sensitive measuring devices. This difficulty of direct coupling transients cannot be overcome simply by increasing the speed of the conventional commutator, or by widening the gaps between commutator segments.

(2) There are regions where the ground at or near the surface is such a good conductor that the skin effect becomes an important factor for frequencies of the order of 40 cycles per second. At these places it is not sufficient to increase the electrode spacing and the sensitivity of the indicating devices to make deep measurements, but the frequency of commutation must also be decreased to such low value that the penetration of the current into the ground is not nullified by the skin effect. For example, at one location in Texas, measurements made with a 37 cycles frequency showed, at a depth of about 200 feet, a perfect insulator layer which could not be penetrated. Measurement made at the same spot with a current having a ½ cycle frequency showed a good conductor at that depth, which result was later checked by logs from near-by wells.

It appears therefore that the synchronous commutator described above is not well suited for the use of low frequencies for the following reasons.

The use of the conventional narrow gaps between the commutator segments causes the brushes to short-circuit these segments at the moment of commutation. With regard to the current circuit, if the speed of rotation of the commutator 2AB is relatively high, for example, 40 revolutions per second, this brief short-circuiting will have no damaging effect on the generator 21, while the effect on the reading of ammeter 22 will be negligible due to the combined inductances of the generator and the ammeter, and the inertia of the latter. A similar situation will obtain in the circuit of the potential commutator 7AB, where the short-circuiting of the segments 7A and 7B by the brushes 14 and 15 will cause the potential drop of the resistance 35 to be applied to the galvanometer 36. However, with a high speed of commutation, the relatively slow response of the galvanometer will prevent any appreciable error from this cause.

It is, however, obvious that if the frequency of commutation is reduced to some very low value, such, for example, as two, one, or one-half cycles per second, the extremely low speed of rotation of the commutator segments will cause the short-circuiting periods to assume considerable time values, which will give rise to a dangerous condition with regard to the current-generating devices, and will cause the measuring devices to oscillate in a manner which will prevent the possibility of accurate readings.

It is, therefore, the object of this invention to provide a commutation system wherein the shorting of the circuits connected to a synchronous commutator is prevented by automatically opening these circuits at each commutation.

It is another object of this invention to prevent transient phenomena due to direct coupling from affecting the accuracy of the measurements by automatically rendering the potential measuring circuit inoperative before the current circuit is opened, and keeping it so until after the current circuit is closed, which is done by short-circuiting the measuring circuit for this period as well as disconnecting it from the earthed electrodes.

It is a further object of the present invention to provide a synchronous commutator suitable for geophysical exploration wherein the stability of the indicating devices is increased and polarization of the potential electrodes is prevented by means of an interrupting and short-circuiting automatic device connected in the potential circuit.

Figure 2:
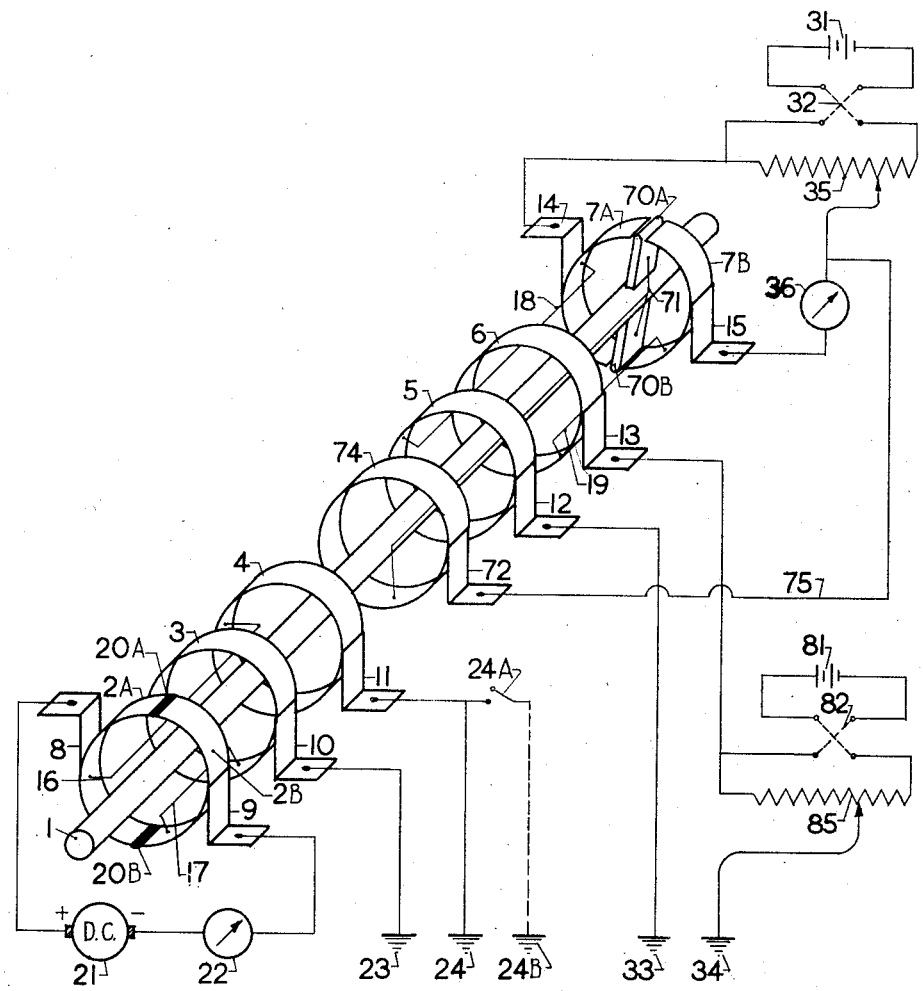
Fig. 2 is a schematic diagram of the synchronous commutator of the present invention.

Referring to Fig. 2, which shows a schematic embodiment of the commutating system of the present invention, the circuit of the current electrodes 23 and 24 is the same as in Fig. 1 with the following exception. The gaps between the segments 2A and 2B of the commutator ring are provided with outward projections 20A and 20B, made of an insulating material such as Bakelite, amber, textilite, etc. These projections are adapted to raise or deflect the brushes 8 and 9, thereby opening the circuit of the generator 21 every time that commutation occurs. The current in the ground flows therefore from electrode 23 to electrode 24, is then discontinued, flows from electrode 24 to electrode 23, and is again discontinued, whereafter the cycle is repeated. When the commutator is rotated slowly, for example, at a speed of the order of one cycle per second, the current flows in either direction for a sufficiently long time for the ammeter 22 to come to its final deflection, which can be accurately read, before the needle tends to fall back to zero at the brief opening of the circuit.

The circuit of the potential electrodes 33 and 34 of Fig. 2 differs from that of Fig. 1 in the following respects.

The gap between the commutator segments 7A and 7B is made somewhat wider than that between commutator segments 2A and 2B. Wedges 70A and 70B, carried by the shaft 1, are inserted within these gaps and are insulated from segments 7A and 7B. These wedges usually are made of a conducting material similar to that of the shaft 1, for example, brass, bronze, etc. The ends of the wedges 70A and 70B project outside the periphery of the commutator ring 7AB by an amount slightly greater than that of the insulating projections 20A and 20B on the current commutator. The wedges 70A and 70B are electrically connected by means of conductor 71 to each other and to a slip ring 74 mounted on the shaft 1. Slip ring 74 is in contact with a brush 72, which is connected by a conductor 75 to a point between the galvanometer 36 and the potential divider 35 of a potentiometer circuit similar to that of Fig. 1. A second potentiometer circuit, comprising a source of E. M. F. 81, a reversing switch 82 and a potential divider 85 is connected in the circuit of the potential electrodes 33 and 34. The object of this second potentiometer circuit is explained in the following paragraph.

The commutated or alternating current flowing in the ground between the current electrodes 23 and 24 generates an alternating potential difference between the potential electrodes 33 and 34. This alternating potential difference is commutated by means of slip rings 5 and 6 and commutator 7AB in synchronism with the commutation of current between the current electrodes 23 and 24, whereby a unidirectional potential difference is impressed on the galvanometer 36. This unidirectional potential difference may be balanced out by a suitable adjustment of the potential divider 35.

Besides an alternating potential difference due to the commutated current passed through the ground, there exists, however, between the potential electrodes 33 and 34, a unidirectional potential difference due to the natural properties of the ground at the location where electrodes 33 and 34 are grounded. This unidirectional natural potential difference between electrodes 33 and 34 is also commutated by means of slip rings 5 and 6, commutator ring 7AB, and is therefore impressed in the form of a commutated or alternating potential on the galvanometer 36. If high speeds of commutation, such as discussed with regard to the circuits of Fig. 1 are used, the galvanometer will not follow these alternations, and the accuracy of its readings will not be affected by this natural ground potential. With the low speeds of commutation used with the circuits of Fig. 2, however, the commutated natural ground potential will cause the galvanometer 36 to swing widely. This natural unidirectional ground potential is therefore balanced out, before it can be applied to brushes 12 and 13, by adjusting the potential divider 85 of the second potentiometer circuit.

The commutation system of the present invention is operated as follows.

The shaft 1 is rotated at a slow speed, which may vary from a fraction of a revolution to a few revolutions per second. A low-frequency commutated interrupted current flows therefore between the electrodes 23 and 24.

The electrodes 33 and 34 detect both the unidirectional natural ground potential, existing between said electrodes, and the alternating potential difference generated by the commutated current flowing between the electrodes 23 and 24. The natural ground potential, as stated above, is balanced out by adjusting the potentiometer 85. The alternating potential difference between the electrodes 33 and 34 is impressed, through the brushes 12 and 13 and slip rings 5 and 6, on the rotating commutator segments 7A and 7B, and is thus again commutated. Since the gaps on the commutator ring 2AB and 7AB are accurately aligned, commutation in the current and in the potential circuits occurs in synchronism. Since the gap in the commutator 7AB is wider, and since the wedges 70A and 70B, adapted to raise or deflect the brushes 14 and 15, project further outside the periphery of the commutator than projections 20A and 20B, the circuit of the potential electrodes is respectively opened before, and is closed after the circuit of the current electrodes. At the moment of commutation, the brushes 14 and 15 are short-circuited by the electrically interconnected wedges 70A and 70B. Since these wedges are electrically connected to slip ring 74, this results, for example, in momentarily short-circuiting the galvanometer 36 between brush 15, wedge 70A, conductor 71, slip ring 74, brush 72, and conductor 75, while at the same time the potentiometer E. M. F. is short-circuited between brush 14, wedge 70B, conductor 71, slip ring 74, brush 72, and conductor 75.

It must be pointed out that the same result cannot be achieved by simply making the gaps between segments 7A and 7B sufficiently wide to prevent their being short-circuited by the brushes 14 and 15 at the moment of commutation, because in such case the undamped galvanometer 36, left on open circuit, is too sensitive to induced or leakage currents.

It must also be pointed out that if the wedges 70A and 70B are omitted and the gaps between segments 7A and 7B are left small as in the arrangement of Fig. 1, their short-circuiting by brushes 14 and 15 at each commutation will cause a direct current from the potentiometer circuit 81 to flow into the ground through electrodes 33 and 34, and would in time cause said electrodes and the ground around them to become polarized.

It has already been stated that the action of the wedges 70A and 70B short-circuits and renders the potential circuit inoperative some time before the current circuit is opened by the action of the insulating projections 20A and 20B, and that in the same manner the potential circuit is operatively closed again some time after the current circuit has also been closed. In this manner, the relatively large undesirable transients due to direct inductive coupling between the current and the potential circuits are not registered by the indicating device 36 and do not affect the measurements. The necessary duration of the time lag between the closing of the current circuit and of the potential or measuring circuit depends on the arrangement and spacing of the electrodes and the sensitivity of the indicating devices. It has been found that lags of from about $1/120$ of a second to about $1/5$ of a second may be used with frequencies of from 6 cycles to $1/4$ cycle per second and with electrode spacings up to 1500 ft. or more when the current intensity in the current circuit is about 2 amperes, and the galvanometer in the potential circuit is capable of indicating potentials of the order of $3 \times 10^{-6}$ volts.

In applying the present commutation system to field work, it has been found that the readings obtained depend to some extent on the value of this time lag, and that this dependence causes anomalies in readings which correspond to anomalies of the ground structure. It will therefore be seen that the present commutation method introduces into the measurements a new parameter which is highly useful for electrical exploration purposes. Thus, in exploring a certain tract in Texas, it was found that a change in the value of this time lag from $\frac{1}{5}$ to $\frac{1}{20}$ of a second changed the resulting readings taken at different locations by a substantially constant amount with the exception of a few locations where the observed change was considerably greater. These locations where a change in the value of the time lag resulted in a disproportionately large change in the readings obtained, were found to correspond to a known position of a large fault.

The value of the time lag may be controlled either by bringing the gaps of the commutator rings 2AB and 7AB slightly out of alignment with each other (which is, however, technically difficult), or simply by varying the speed of the commutator, or by slightly advancing or retarding the brushes 14 and 15 of the potential commutator with regard to the brushes 8 and 9 of the current commutator.

Changing the speed of commutation changes the duration of all parts of the commutation cycle. However, in view of the slow speed of rotation used, the time lag is the only part of the cycle which is sufficiently sensitive to small changes in speed to affect the value of the readings.

The manner in which the value of the time lag may be controlled by advancing or retarding the brushes 14 and 15 of the potential commutator, is diagrammatically shown in Fig. 3, wherein A indicates the time period during which the circuit of the potential electrodes is rendered inoperative (brushes 14 and 15 being short-circuited by wedges 70A and 70B); B indicates the time period during which the circuit of the current electrodes is open (brushes 8 and 9 being raised by the insulating projections 20A and 20B); and C indicates the time lag between the closing of the current and potential circuits. This diagram clearly shows that by rotating brushes 14 and 15 clockwise with regard to the commutator 7AB, while keeping them always 180° apart, the time lag C may be given, within a certain range, a desired value. It must be noted that the brushes 14 and 15 should never be rotated as far as to permit the time lag C to assume a zero or negative value, whereby the potential circuit would be closed at the same time, or before the current circuit. The time lag C should preferably be given a reasonable value sufficient to allow the direct coupling transients, caused by the closing of the current circuit, to decay sufficiently to allow significant measurements to be made.

Referring to Fig. 2, the present commutation system has been described in its application to a typical Gish-Rooney circuit used for geophysical exploration. It is, however, obvious that the present invention may be used in connection with any other circuit or circuits carrying low-frequency commutated currents. For example, by providing an electrode 24B connected to the brush 11 by a switch 24A, the present commutator may be used for electrical exploration by the method described by H. M. Evjen in his co-pending application Serial No. 147,060, filed June 8, 1936.

It is understood that Fig. 2 gives only a diagrammatic representation of the present commutator necessary for understanding its operation. In actual practice, this commutator in constructed in a manner shown in perspective in Fig. 4, and in vertical cross-section in Fig. 5, the same parts being indicated by the same numerals as in Fig. 2.

Figs. 4 and 5 show that the current commutator consists of two cylindrical bodies 51 and 52, mounted on the shaft 1. One end of each of said bodies, namely, the ends facing each other, are recessed so as to form segments 53 projecting coaxially with the shaft 1, as shown in Figs. 4, 6 and 8. The particular commutator shown has 3 projecting segments on each of the bodies 51 and 52 (although any desired number may be used), and the segments on body 51 are therefore angularly displaced with regard to those on body 52 by $$\frac{180}{3}$$

that is, by 60 degrees. Brushes 11 and 10 are in contact with the non-recessed portions of the bodies 51 and 52 respectively, while brushes 8 and 9 are made sufficiently wide to contact alternately with the projecting segments 53 on body 51 and with those on body 52. It will therefore be seen that the non-recessed portions of bodies 51 and 52 correspond to slip rings 4 and 3 of Fig. 2, while the projecting segments 53 on said bodies correspond to the commutator segments 2A and 2B of Fig. 2. The interrupting insulating projections 20A and 20B of Fig. 2 are made in the form of an insulating disc 55 shown in Fig. 7, which is mounted between the bodies 51 and 52 as shown in Figs. 4 and 5. The teeth of this insulating disc are in alignment with the radial lines defining the projecting segments 53 and project outside the circumference of the commutator segments and interrupt the current at each commutation by raising or deflecting the brushes 8 and 9.

The potential commutator, also shown in Fig. 5, is constructed in a manner generally similar to that of the current commutator, with the exception that the insulating interrupting disc 55 of Fig. 7 is replaced by a short-circuiting conductor disc 56 shown in Fig. 9. The toothed disc of Fig. 9 corresponds to the short-circuiting wedges 70A and 70B and the slip ring 74 of Fig. 2. The brush 72, as shown in Figs. 4 and 5, is mounted in this particular case at 60 degrees, or in general at $$\frac{360}{n}$$

degrees to either brush 14 or brush 15, $n$ being the number of teeth on the interrupting disc of Fig. 7, so as to be in contact with one of the teeth of the interrupting disc of Fig. 9 whenever brushes 14 and 15 are also in contact with two diametrically opposite teeth of said disc.

It is understood that the present invention is in no way limited to any of the structural details described above, such for example, as the number of commutator segments, arrangement of brushes, etc., but pertains broadly to a system of synchronous commutation particularly adapted for geophysical exploration, wherein a low frequency interrupted commutated current is made to flow in the current circuit, and the potential circuit is interrupted and short-circuited in synchronism with the commutation occurring in the current circuit, the period of the short-circuiting of the potential circuit beginning respectively before and ending after the beginning and the end of the period of interruption of the current circuit, and the time lag between the closing of the current circuit and the closing of the potential circuit after each interruption being subject to control.

I claim as my invention:

1. In a commutation system comprising two electrical circuits, a source of direct current in the first circuit, means for periodically reversing the direction of the current flow in the first circuit, means for interrupting said flow at each reversal, an indicating device in the second circuit, means for reversing the polarity of the second circuit in synchronism with the current reversals of the first circuit, and means for short-circuiting the indicating device in synchronism with the interruptions of the current flow in the first circuit.

2. In a synchronous commutator, a rotatable shaft, a first commutator mounted on said shaft and insulated therefrom, said commutator comprising a first annular electrically conductive body recessed at one end to form at least one segmental projection co-axial with the shaft, the outside circumference of said projection coinciding with that of the non-recessed portion of the annular body, and a second recessed annular body similar to the first, the projecting segments on the two bodies being directed towards each other and angularly displaced with regard to each other by a number of degrees equal to 180 divided by the number of segments on either body, an insulating disc mounted on the shaft between said two annular bodies and having radial projections extending slightly outside the periphery of said annular bodies along the radial lines defining the area of said segmental projections in a plane perpendicular to the axis of the shaft, a brush in continuous electrical contact with the non-recessed portion of the first annular body, a brush in continuous electrical contact with the non-recessed portion of the second annular body, two brushes angularly displaced with regard to each other by 180 degrees and having a width sufficient to permit alternate contact with the outside periphery of the projecting segments on either annular body when the shaft is rotated, a second commutator mounted on the shaft and insulated therefrom, comprising two annular recessed bodies constructed and mounted on the shaft in a manner similar to that of the first commutator, an electrically conductive disc mounted on said shaft between said last annular bodies and insulated therefrom, said disc having radial projections extending outside the periphery of said bodies by an amount slightly greater than that of the insulating disc of the first commutator, said projections extending along radial lines defining the area of the segmental projections of said last annular bodies, the projections on said conductive disc being in radial alignment with the projections on the insulating disc of the first commutator, a brush in continuous electrical contact with the non-recessed portion of one of said last annular bodies, a brush in continuous contact with the non-recessed portion of the other of said last annular bodies, two brushes displaced with regard to each other by 180 degrees and having a width sufficient to permit alternate contact with the outside periphery of the projecting segments on either of said last annular bodies and with the radial projections of the disc mounted between said bodies when the shaft is rotated, and a brush capable of coming into contact with the projections on said disc when the shaft is rotated, said brush being angularly displaced with regard to any one of the other brushes by a number of degrees equal to 360 divided by the number of projections on said disc.

3. In a commutation system adapted for geophysical exploration, two electrical circuits each comprising the ground as a part thereof, a source of direct current in the first circuit, an indicating device in the second circuit, means for periodically reversing the direction of the current flow in the first circuit, means for interrupting said flow at each reversal, means for reversing the polarity of the second circuit in synchronism with the reversals of the current in the first circuit, means for opening that portion of the second circuit comprising the ground, and for simultaneously short-circuiting that portion of the second circuit comprising the indicating device in synchronism with the interruptions of current occurring in the first circuit, the beginning and end of said opening and short-circuiting periods occurring respectively before and after the beginning and end of the interruption periods in the first circuit.

4. In the system of claim 3, means to control the relative values of the time lag occurring between the beginning of the opening and short-circuiting period in the second circuit and the beginning of the interruption period in the first circuit, and of the time lag occurring between the end of the interruption period in the first circuit and the end of the opening and short-circuiting period of the second circuit.

5. In a commutation system adapted for geophysical exploration, a source of direct current, a rotatable shaft, a commutator having at least two commutating segments mounted on said shaft and insulated therefrom, each of said segments being connected to a slip ring mounted on said shaft and insulated therefrom, at least one electrical circuit connected between said slip rings, said circuit comprising at least two grounded electrodes and the ground therebetween, means to bring each of said commutator segments into alternate contact with the terminals of the source of direct current by rotating the shaft, whereby the direction of the current flowing through the ground is periodically reversed, means rotatable with the shaft to interrupt said current at each reversal, a second commutator having an equal number of commutating segments mounted on the shaft and insulated therefrom, each of said segments being connected to a slip ring mounted on the shaft and insulated therefrom, at least one electrical circuit connected between said slip rings, said circuit comprising two grounded electrodes and the ground therebetween, an indicating device, means to bring each of the segments of the second commutator into alternate contact with the terminals of said indicating device, means rotatable with the shaft for simultaneously opening the circuit of the grounded electrodes and short-circuiting the indicating device in synchronism with the interruptions of current occurring in the circuit of the first commutator, the beginning and end of said opening and short-circuiting periods occurring respectively before and after the beginning and end of said interruption periods.

6. In a commutation system adapted for geophysical exploration, a source of direct current, a rotatable shaft, a commutator having at least two commutating segments mounted on said shaft and insulated therefrom, each of said segments being connected to a slip ring mounted on said shaft and insulated therefrom, at least one electrical circuit connected between said slip rings, said circuit comprising at least two grounded electrodes and the ground therebetween, means to bring each of said commutator segments into alternate contact with the terminals of the source of direct current by rotating the shaft, whereby the direction of the current flowing through the ground is periodically reversed, means rotatable with the shaft to interrupt said current at each reversal, a second commutator having an equal number of commutating segments mounted on the shaft and insulated therefrom, each of said segments being connected to a slip ring mounted on said shaft and insulated therefrom, at least one electrical circuit connected between said slip rings, said circuit comprising in series an adjustable source of electromotive force, two grounded electrodes and the ground between said electrodes, a circuit comprising a second adjustable source of electromotive force and an indicating device in series between two terminals, means to bring each of the segments of the second commutator into alternate contact with said terminals, and means rotatable with the shaft and electrically connected to a point between said second source of electromotive force and said indicating device for opening the circuit of the grounded electrodes and for separately short-circuiting said second source of electromotive force and said indicating device in synchronism with the interruptions of current occurring in the circuit of the first commutator, the beginning and end of said opening and short-circuiting periods occurring respectively before and after the beginning and the end of said interruption periods.

7. In the system of claim 5, means to control the relative values of the time lag occurring between the beginning of the short-circuiting period in the second circuit and the beginning of the interruption period in the first circuit, and of the time lag occurring between the end of the interruption period in the first circuit and the end of the short-circuiting period of the second circuit.

8. In a method of geophysical exploration comprising the use of at least two current and two potential electrodes, the steps of passing an interrupted commutated current through the ground between the current electrodes, detecting between the potential electrodes the natural ground potential and the reversing potential generated by the commutated current flowing between the current electrodes, balancing out the natural ground potential by means of an adjustable source of electromotive force connected in series with one of the potential electrodes, commutating the reversing potential generated between the potential electrodes in synchronism with the commutations of the current passed through the ground, impressing said commutated potential on an indicating device, and short-circuiting said indicating device in synchronism with the interruptions of the current passing between the current electrodes, said short-circuiting periods beginning and ending respectively before and after said interruption periods.

9. In the process of claim 8, the step of varying the relative values of the time lag between the beginning of said short-circuiting periods and said interruption periods, and of the time lag between the end of said interruption periods and the end of said short-circuiting periods.

10. In a method of geophysical exploration, the steps of passing an interrupted commutated reversing current through the ground, detecting the reversing potential generated in the ground by said current, commutating said reversing potential in synchronism with the commutations of the current passed through the ground, impressing said commutated potential on an indicating device, reducing the readings of said device to zero by applying thereto an opposing potential from an adjustable source of electromotive force and short-circuiting the indicating device in synchronism with the interruptions in the flow of the current passed through the ground.

11. In a method of geophysical exploration, the steps of causing an interrupted commutated current to flow through the ground, detecting the reversing potential generated in the ground by said current, commutating said reversing potential in synchronism with the commutations of the interrupted current flowing through the ground, impressing said commutated potential on an indicating device, and short-circuiting the indicating device in synchronism with the interruptions of the current flowing through the ground.

12. In a method of geophysical exploration by means of a system comprising a current circuit and a potential circuit, the steps of causing by means of the current circuit an interrupted commutated current to flow through the ground, detecting by means of the potential circuit the unidirectional natural ground potential and the reversing potential generated in the ground by the commutated current flowing in the current circuit, balancing out said unidirectional potential by applying an adjustable potential to the potential circuit, commutating said reversing potential in synchronism with the commutations of the current flowing in the current circuit, impressing said commutated potential on an indicating device and short-circuiting said indicating device in synchronism with the interruptions of the current flowing in the current circuit.

DAVID SAVILLE MUZZEY, Jr.